T. Wightman,
Glass Tool.
No. 102,899.  Patented May 10, 1870.
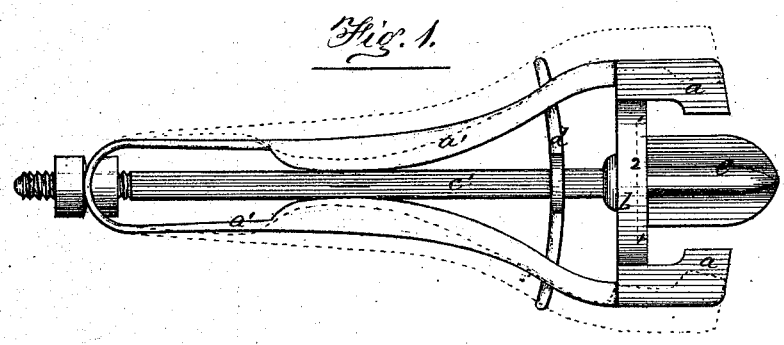
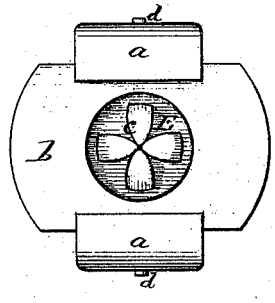
Witnesses:
Inventor:

United States Patent Office.

THOMAS WIGHTMAN, OF PITTSBURG, PENNSYLVANIA.

Letters Patent No. 102,899, dated May 10, 1870.

IMPROVED SPRING CLAMP FOR GLASS-BLOWERS.

The Schedule referred to in these Letters Patent and making part of the same.

I, THOMAS WIGHTMAN, of Pittsburg, in the county of Allegheny and State of Pennsylvania, have invented certain Improvements in the Glass-Blowers' Spring Clamp for Shaping the Mouth-Edges and Lips of Glass Vessels, of which the following is a specification.

Nature and Objects of the Invention.

My invention relates to the combination, with the mouth-core and lip-plate in a glass-blowers' spring clamp, of a recess around the core in the lip-plate, in such a manner that the said recess will readily produce a fillet on the inner edge of the flat upper surface around the mouth of a glass vessel, being rotated in the said clamp for the purpose, the object of the said fillet being to facilitate the application or adjustment of the usual packing-ring concentrically upon the flat upper surface around the mouth of a glass vessel intended for preserving fresh fruits, &c.

Description of the Accompanying Drawings.

Figure 1 is a side view of a glass-blower's spring clamp as when closed, and

Figure 2 is a plan view of the core end of the same, embodying my invention.

General Description.

The glass-blower's spring clamp is a well-known implement, consisting of two jaws, $a\ a$, on the ends of a bent spring $a'\ a'$, which forms the handle, in combination with an intervening plate, $b$, in the center of which is supported a skeleton core, $c$, by an adjustable stem, $c'$, as represented in the drawings.

In using the said clamp the mouth end of the glass vessel is formed by applying the hot plastic mouth end of the same, around over the core $c$ and against the plate $b$, then closing the jaws $a\ a$ upon it gradually, and at the same time rotating the vessel so as to produce, by compression, a mouth and lip which will, in general shape or form, be counterparts of the said jaws, plate, and core.

A curved cross-piece, $d$, is fixed on the stem $c'$, and its two ends slipping accurately in respective holes in the two arms $a'\ a'$ of the spring, serve as guides for the moving jaws $a\ a$.

My invention consists of a circular recess, E, made in the center of the plate $b$, the diameter of which recess is about a quarter of an inch, more or less, greater than the diameter of the base of the skeleton core $c$, which is fixed concentrically in the said recess, as represented in fig. 2, and by the dotted lines 1 2 in fig. 1.

It will be readily understood, without further description, that, as the hot plastic glass of the mouth end of the jar or bottle to be operated on is passed over the core $c$, and pressed firmly against the plate $b$, and then rotated while the jaws $a\ a$ are being compressed upon the plastic glass, a fillet will be readily and quickly formed upon the inner edge of the flat upper surface around the mouth of the vessel, which will be a counterpart of that part of the recess E which surrounds the base of the core $c$.

Claim.

I claim as my invention—

The recess E, in combination with the plate $b$ and core $c$, substantially as and for the purpose hereinbefore set forth.

THOS. WIGHTMAN.

Witnesses:
 M. A. LORENZ,
 JOHN R. WIGHTMAN.